US006137276A

United States Patent [19]

Rudolph

[11] Patent Number: 6,137,276

[45] Date of Patent: Oct. 24, 2000

[54] ONHOOK TELECOM POWER SUPPLY REGULATOR MODE

[75] Inventor: Neal Rudolph, Ogdensburg, N.Y.

[73] Assignee: Mitel, Inc., Herndon, Va.

[21] Appl. No.: 09/255,461

[22] Filed: Feb. 22, 1999

[51] Int. Cl.[7] ................................ G05F 1/40; H02M 7/00

[52] U.S. Cl. ............................ 323/282; 323/272; 363/60; 363/80

[58] Field of Search ..................................... 323/282, 274, 323/261, 273, 275, 276, 269, 265; 363/60, 80, 44

[56] References Cited

U.S. PATENT DOCUMENTS 4,319,179 3/1982 Jett, Jr. .................................... 323/281

5,933,337 8/1999 Teramae et al. ........................... 363/60

FOREIGN PATENT DOCUMENTS 3405847 8/1985 Germany .

*Primary Examiner*—Peter S. Wong
*Assistant Examiner*—Rajnikant D. Patel
*Attorney, Agent, or Firm*—Jordan and Hamburg LLP

[57] ABSTRACT

A low quiescent current draw regulator comprising a low output conductance device for receiving a variable DC input voltage and for providing a first nominal quiescent constant current through a serially connected resistor and a reference diode, and a circuit coupled across the resistor and reference diode for providing a substantially regulated output voltage.

16 Claims, 1 Drawing Sheet

ONHOOK TELECOM POWER SUPPLY REGULATOR MODE

FIELD OF THE INVENTION

This invention relates to the field of telephony, and in particular to a voltage regulator that can be connected to a telephone line and which has very low current leakage in the on-hook line condition.

BACKGROUND TO THE INVENTION

Various devices (equipment) can be connected to the telephone line and receive operating power from the line. When the telephone line is the on-hook state, the line voltage is typically higher than in the off-hook state. It would therefore be expected that a device connected to the telephone line would draw more current during the on-hook state than in the off-hook state, in the absence of a voltage regulator connected between the device and the telephone line. However, in some cases, the amount of current drawn by the voltage regulator can exceed a prescribed standard.

It will be recognized that only a restricted amount of current can be drawn from the line while the on-hook condition of the line is maintained. If too much current is drawn, e.g. By the regulator, the on-hook state will be undesirably exited and the off-hook state will be entered. For this reason, the regulatory agencies and/or the telephone companies prescribe a standard that restricts the amount of current that can be drawn from the line in the on-hook line condition.

The line voltage is not uncommonly as low as under 3 volts DC at the end of a line from 24 or 50 volts provided by a PBX or central office, as high as 240 volts AC provided by ringing generators, to as high as 800 volts of a voltage transient. A voltage regulator must be able use any of this wide range of voltages and to withstand the highest voltage and deliver a stable DC voltage to equipment, e.g. 3.3 volts.

In order to conserve power, some telephone regulatory agencies have decreed that the standby, (or on-hook) power drawn from the line power supply equipment, e.g. typically located at a PBX or central office, must be very low, such as less than 25 μA with an applied line tip/ring voltage of 25 volts, and preferably less. In the past, this has been very difficult to achieve.

SUMMARY OF THE INVENTION

The present invention operates over a wide range of line voltages while maintaining a low amount of current draw. For example, the present invention has exhibited standby (on-hook) current draw of between 18 and 19 μA with an input voltage of between 8.0 volts and 100 volts DC, with a constant (regulated) output voltage of 3.3 volts DC which value is presently ideal for powering logic circuitry. At an input of 3.65 volts the standby current draw was 16 μA and the output voltage was 2.7 volts DC.

This was achieved with an embodiment of the invention in the form of a low quiescent current draw regulator comprising a low output conductance device for receiving a variable DC input voltage and for providing a first nominal quiescent constant current through a serially connected resistor and a reference diode, and a circuit coupled across the resistor and reference diode or providing a substantially regulated output voltage.

In accordance with another embodiment, a low quiescent current draw regulator comprises:

(a) a circuit for providing a positive DC variable voltage node and an opposite polarity voltage node from a power source, (b) a low output conductance, depletion mode N-channel MOSFET, its drain being connected to the voltage node, (c) a zener diode, its cathode being connected to the gate of the MOSFET and its anode connected to said opposite polarity voltage node, (d) a resistor connected between the gate and source of the MOSFET, and (e) a circuit coupled to the source of the MOSFET and to said opposite polarity voltage node for providing a DC output voltage.

BRIEF INTRODUCTION TO THE DRAWINGS

A better understanding of the invention may be obtained by reading the detailed description of the invention below, in conjunction with the following drawings, in which:

FIG. 1 is a schematic diagram of the preferred embodiment of the invention.

DETAILED DESCRIPTION OF THE PREFERRED EMBODIMENT

Figure 1:
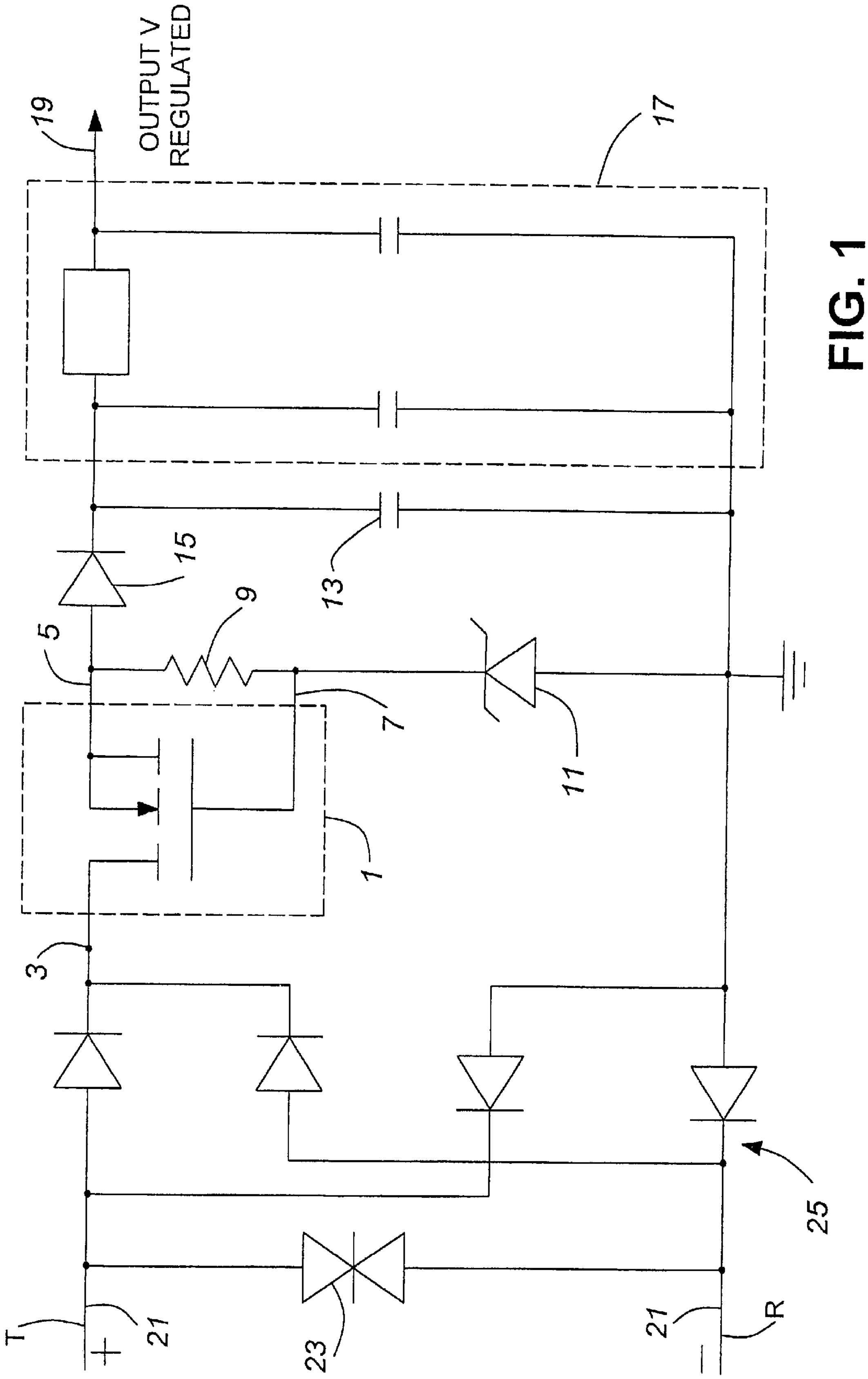

A low output conductance control device 1 has a power supply input 3 for receiving a variable DC input voltage. A resistor 9 is connected across an output 5 of the device and a control input 7 of the device. A reference diode 11 is connected in series with the resistor 9, to another polarity of the input voltage, e.g. which can be connected to ground.

Preferably the device 1 is a low output conductance, depletion mode N-channel metal-oxide-silicon field effect transistor (MOSFET), having its drain connected to the input 3, its source connected to the resistor 9 at output 5, and its gate connected to the junction between the diode 11 and the resistor 9. Preferably the diode 11 is a zener diode, having its anode connected to ground and its cathode connected to the resistor 9 and gate of the MOSFET.

A MOSFET that was used in a successful laboratory prototype was type ND2410L. This FET provided a constant current via its gate-to-source voltage across the resistor, which had a resistance of 1 megohm. This constant current source supplied a fixed current to the reference zener diode 11 (type 1N4690 was used in the successful prototype which had a breakdown voltage of 5.6 volts).

The saturation characteristics and low output conductance of the MOSFET as described make it ideal as a current regulator. A change in either the input voltage or load impedance changes the regulated current only proportional to its output conductance, which is substantially constant. These characteristics provide a near constant current over a wide input voltage range when its drain-to-source voltage exceeds pinch-off of the MOSFET, and it becomes saturated. The wide input operating voltage range is important when considering line powered telephone operation.

In addition, the negative gate-to-source voltage performance of the depletion mode FET allows simplified biasing at a very low quiescent current penalty. This low quiescent current is important when considering the on-hook current draw criteria dictated by the regulatory agencies and/or the telephone companies.

In operation, the circuit begins to regulate when the drain voltage of the FET becomes high enough for gate-to-source pinch-off to occur, and for the zener diode to become turned on. For the example ND2410L FET, pinch-off is specified as being in the range from −0.5 volts to −2.5 volts. This pinch-off voltage is a constant of the FET, and establishes a very stable constant current through the resistor 9. The constant current is also passed through the zener diode, which typically has been found to be about 2 μA with a 1 megohm resistor across the gate and source of the FET. At 2 μA the zener voltage of the zener diode 11 is about 5.2 volts. With an FET drain-to-source saturation voltage of 0.1 volt, the circuit began to regulate when the drain voltage reached 7.3 volts. It will be recognized that this voltage will vary from circuit to circuit, with component variations in the gate-to-source voltage of the FET, the tolerances of the resistor 9 resistance and of the zener voltage of the zener diode.

While the described circuit dropped out of regulation at a drain voltage of 7.3 volts, the circuit still passed voltages as low as 4 volts from the telephone line.

It is desirable that the circuit should provide a predetermined period of output voltage (e.g. 5 seconds) when the input supply is interrupted. To provide this, a capacitor 13 is coupled across the series circuit of resistor 9 and diode 11, preferably through a coupling diode 15.

In addition, a logic voltage regulator 17 is preferred to be connected with its inputs across capacitor 13, to supply e.g. regulated 3.3 volts to a circuit to be powered from its output terminal 19 and ground.

With a type 78LC33 type logic voltage regulator, which has a quiescent current of 1 μA and an output voltage of 3.3 volts, a capacitor 13 value of 33 μF provided about 7.8 seconds of holdover time, assuming an external current draw of about 15 μA. The holdover time can be calculated by the equation $dt=(dV\times C)/I$, where dt is the holdover time, V is the voltage change, C is the capacitance and I is the total current draw. Thus for the above case, $7.8=(3.8\ V\times 33\mu F)/16\ \mu A$, where the 16 μA is derived from the 1 μA drawn by the voltage regulator and 15 μA is drawn by the external logic circuit. The voltage 3.8 is derived from the 5.2 volt zener voltage plus the FET gate-to-source voltage, minus the 0.1 volt forward voltage drop of the diode 15 minus the 3.3 output voltage of the regulator.

The input voltage is typically supplied from tip T and ring R leads of a telephone line 21. In order to guard the circuit from transients and other over-voltage effects it is preferred that a surge protector 23 should be connected across the tip and ring leads.

Since the polarity of the voltage on the line 21 may change, it is preferred to insert a polarity correcting circuit such as a bridge rectifier 23 between the line 21 and the input 3. This provides the circuit with polarity insensitivity from the power supply (e.g. PBX or central office) side. However, it should be noted that the forward voltage of the diodes used in the bridge rectifier decreases the input operating range of the circuit described herein.

The present invention thus provides a very low on-hook line condition current draw, while providing a regulated voltage that can be used by devices such as dialers which require a supply voltage input sufficient to power logic circuitry, in the presence of a very wide range of supply voltages. I addition, in an embodiment it can provide a long voltage-maintained holdover time to a powered circuit in the case of interruption of the input power.

A person understanding the above-described invention may now conceive of alternative designs, using the principles described herein. All such designs which fall within the scope of the claims appended hereto are considered to be part of the present invention.

I claim:

1. A telecom power supply for accepting a variable DC input line voltage and providing a regulated output voltage with low quiescent current draw, comprising:

a conductance device having an input receiving the variable DC input line voltage, a control input and an output and for providing an output current;

a serial circuit including a resistor serially connected to a reference diode at a reference voltage node, the serial circuit having the resistor connected to the output of the conductance device and the reference diode connected to a reference potential, and the reference node being connected to the control input of the conductance device to control a conductance thereof based on the potential across said resistor; and a voltage regulating circuit having an input coupled to the output of the conductance device to receive current therefrom, a reference input connected to the reference potential, and an output for providing a substantially regulated output voltage.

2. The telecom power supply as defined in claim 1 wherein the reference diode is a low current zener diode.

3. The telecom power supply as defined in claim 2 wherein the conductance device is a substantially low output conductance depletion-mode N channel MOSFET.

4. The telecom power supply as defined in claim 2 wherein the conductance device is a high voltage substantially low output conductance depletion-mode N channel MOSFET.

5. The telecom power supply as defined in claim 3 wherein the MOSFET is type ND2410L.

6. The telecom power supply as defined in claim 3 wherein the zener diode has a turn-on voltage which is higher than a pinch-off voltage of the MOSFET.

7. The telecom power supply as defined in claim 6 wherein said voltage regulating circuit provides an output voltage at a nominal logic level value.

8. The telecom power supply as defined in claim 6 further comprising a capacitor coupled across the serial circuit of the resistor and the reference diode for storing charge and maintaining a nominal voltage level for a predetermined time upon interruption of the variable DC input line voltage.

9. The telecom power supply as defined in claim 8, further comprising a rectifier means connected across the input of the conductance device and the reference potential for providing said variable DC input line voltage with a predetermined polarity to the input of the conductance device.

10. The telecom power supply as defined in claim 8 further comprising a diode connected in a forward conducting direction from the output of the conductance device to the capacitor.

11. A telecom power supply comprising:

an input circuit for providing a DC variable voltage across a positive polarity voltage node and a negative polarity voltage node from a power source;

a low output conductance, depletion mode N-channel MOSFET having a drain connected to the positive polarity voltage node, a source and a gate;

a zener diode having a cathode connected to the gate of the MOSFET and an anode connected to said negative polarity voltage node;

a resistor connected between the source of the MOSFET and the gate of the MOSFET controlling a conductance of the MOSFET; and an output circuit coupled to the source of the MOSFET and to said negative polarity voltage node for providing a voltage regulated DC output voltage using current supplied from the source of the MOSFET.

12. The telecom power supply as defined in claim 11 wherein the zener diode has a turn-on voltage which is higher than a pinch-off voltage of the MOSFET.

13. The telecom power supply as defined in claim 12 wherein said output circuit includes a capacitor coupled across the source of the MOSFET and the negative polarity voltage node for storing charge and providing voltage from which the voltage regulated DC output voltage is derived.

14. The telecom power supply as defined in claim 13 wherein said output circuit includes a logic level voltage regulator coupled between the capacitor and an output terminal and coupled to the negative polarity voltage node.

15. The telecom power supply as defined in claim 14 wherein said input circuit includes a rectifier means connected across a pair of input terminals for receiving an input voltage and for providing said DC variable voltage with a predetermined polarity to the drain of the MOSFET.

16. The telecom power supply as defined in claim 13 including a diode connected between the source of the MOSFET and the capacitor, a cathode of the diode being connected to the capacitor.

* * * * *